(12) United States Patent
Moorkanat et al.

(10) Patent No.: US 8,650,206 B2
(45) Date of Patent: Feb. 11, 2014

(54) SYSTEM AND METHOD FOR PROVIDING BUFFER INVENTORY PROFILE IN A DISCRETE TIME SUPPLY CHAIN PLANNER USING A NESTED BUCKETIZATION STRUCTURE

(75) Inventors: Jayan Moorkanat, Bangalore (IN); Nitin Singal, Bangalore (IN); Bhanu Gotluru, Bangalore (IN); Gayathri Chennimalai, Bangalore (IN)

(73) Assignee: JDA Software Group, Inc., Scottsdale, AZ (US)

( * ) Notice: Subject to any disclaimer, the term of this patent is extended or adjusted under 35 U.S.C. 154(b) by 237 days.

(21) Appl. No.: 12/689,345

(22) Filed: Jan. 19, 2010

(65) Prior Publication Data

US 2011/0106839 A1 May 5, 2011

Related U.S. Application Data

(60) Provisional application No. 61/145,829, filed on Jan. 20, 2009.

(51) Int. Cl.
*G06F 17/30* (2006.01)

(52) U.S. Cl.
USPC .................................. 707/769; 707/999.104

(58) Field of Classification Search
USPC ......................................... 707/769, 999.104
See application file for complete search history.

(56) References Cited

U.S. PATENT DOCUMENTS

| 7,702,628 | B1 * | 4/2010 | Luchangco et al. ... 707/999.006 |
| 2002/0069096 | A1 * | 6/2002 | Lindoerfer et al. .......... 705/7.25 |
| 2006/0129260 | A1 | 6/2006 | Chen et al. |
| 2006/0271420 | A1 | 11/2006 | Anselmann et al. |
| 2007/0226281 | A1 * | 9/2007 | Joisha .................... 707/999.206 |
| 2011/0173028 | A1 * | 7/2011 | Bond ................................ 705/3 |

* cited by examiner

*Primary Examiner* — Monica Pyo
(74) *Attorney, Agent, or Firm* — Jackson White, PC; Steven J. Laureanti

(57) ABSTRACT

A system and method is disclosed for providing nested bucketization in a supply chain network. The system includes a server coupled with a database and configured to access data describing a time horizon of a specified time interval. The server is further configured to create an on-hand inventory profile which comprises a set of (day, quantity) pairs, stored in a linked list within a data structure involving nested buckets, wherein the on-hand inventory profile points to an empty link list when first created and store the on-hand inventory profile in the database.

25 Claims, 3 Drawing Sheets

SYSTEM AND METHOD FOR PROVIDING BUFFER INVENTORY PROFILE IN A DISCRETE TIME SUPPLY CHAIN PLANNER USING A NESTED BUCKETIZATION STRUCTURE

CROSS-REFERENCE TO RELATED APPLICATIONS

The present invention is related to that disclosed in U.S. Provisional Patent Application Ser. No. 61/145,829, filed 20 Jan. 2009, entitled "Data Representation for Buffer Inventory Profile in a Discrete Time Supply Chain Planner using a Nested Bucketization Structure." U.S. Provisional Patent Application Ser. No. 61/145,829 is assigned to the assignee of the present application. The subject matter disclosed in U.S. Provisional Patent Application Ser. No. 61/145,829 is hereby incorporated by reference into the present disclosure as if fully set forth herein. The present invention hereby claims priority under 35 U.S.C. §119(e) to U.S. Provisional Patent Application Ser. No. 61/145,829.

TECHNICAL FIELD OF THE INVENTION

This invention relates generally to a data structure, and more particularly to system and method for providing nested bucketization in a supply chain network.

BACKGROUND OF THE INVENTION

In a supply chain network, one or more entities provide materials to one or more other entities that produce intermediate or finished goods. However, because of the increasing number of entities within the supply chain network, managing the inventory operations of, for example, on-hand inventory of the multiplicity of entities is too cumbersome. In addition, there is currently no specific data structure for the discrete time environment. The inability to effectively manage inventory operations and for the discrete time environment is undesirable.

SUMMARY OF THE INVENTION

A system for providing nested bucketization in a supply chain network is disclosed. The system includes a database that stores data describing a time horizon of a specified time interval. The system further includes a server coupled with a database and configured to access the data describing the time horizon of the specified time interval. The server is further configured to create an on-hand inventory profile which comprises a set of (day, quantity) pairs, wherein the on-hand inventory profile points to an empty link list when first created and store the on-hand inventory profile in the database.

A method of nested bucketization is also disclosed. The method provides for accessing, by a computer, data describing a time horizon of a specified time interval. The method further provides for creating, by the computer, an on-hand inventory profile which comprises a set of (day, quantity) pairs, wherein the on-hand inventory profile points to an empty link list when first created and storing, by the computer, the on-hand inventory profile in a database.

A computer-readable medium embodied with software providing nested bucketization in a supply chain network is also disclosed. The software when executed using one or more computers is configured to access data describing a time horizon of a specified time interval. The software is further configured to create an on-hand inventory profile which comprises a set of (day, quantity) pairs, wherein the on-hand inventory profile points to an empty link list when first created and store the on-hand inventory profile in a database.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
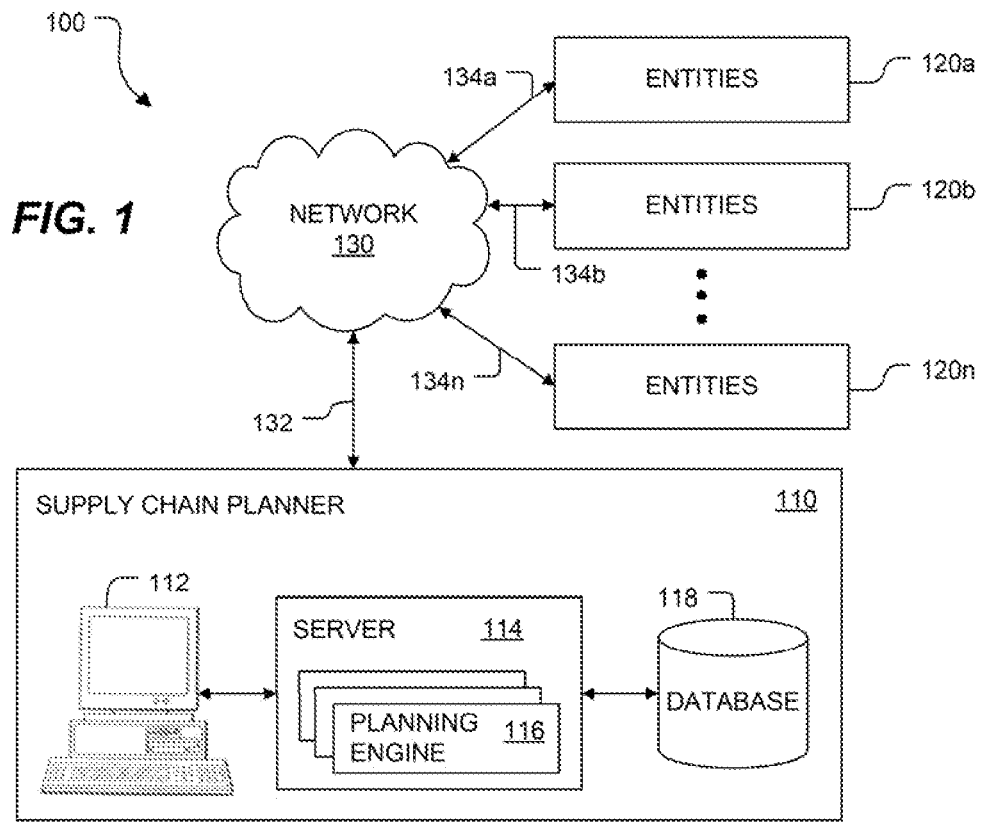
FIG. 1 illustrates an exemplary system according to a preferred embodiment.

FIG. 1 illustrates an exemplary system according to a preferred embodiment. System 100 comprises supply chain planner 110, one or more entities 120a-120n, a network 130, and communication links 132 and 134a-134n. Although supply chain planner 110, one or more entities 120a-120n, and a single network 130, are shown and described; embodiments contemplate any number of supply chain planners 110, any number of entities 120a-120n, and/or any number of networks 130, according to particular needs. In addition, or as an alternative, supply chain planner 110 may be integral to or separate from the hardware and/or software of any one of the one or more entities 120a-120n.

In one embodiment, one or more entities 120a-120n represent one or more supply chain networks including one or more supply chain entities, such as, for example suppliers, manufacturers, distribution centers, retailers, and/or customers. A supplier may be any suitable entity that offers to sell or otherwise provides one or more items (i.e., materials, components, or products) to one or more manufacturers. A manufacturer may be any suitable entity that manufactures at least one finished good. A manufacturer may use one or more items during the manufacturing process to produce a finished good. In this document, the phrase "finished good" may refer to any manufactured, fabricated, assembled, or otherwise processed item, material, component, good or product. A finished good may represent an item ready to be supplied to, for example, another supply chain entity in system 100, such as a supplier, an item that needs further processing, or any other item. A manufacturer may, for example, produce and sell a finished good to a supplier, another manufacturer, a distribution center, a retailer, a customer, or any other suitable person or entity. A distribution center may be any suitable entity that offers to sell or otherwise distributes at least one finished good to one or more retailers and/or customers. A retailer may be any suitable entity that obtains one or more finished goods to sell to one or more customers.

Although one or more entities 120a-120n is shown and described as separate and distinct entities, the same person or entity can simultaneously act as any one of the one or more entities 120a-120n. For example, one or more entities 120a-120n acting as a manufacturer could produce a finished good, and the same entity could act as a supplier to supply an item to another supply chain. Although one example of a supply chain network is shown and described, embodiments contemplate any operational environment and/or supply chain network, without departing from the scope of the present invention.

Supply chain planner 110 comprises one or more computers 112, one or more servers 114, and one or more databases 118. In one embodiment, supply chain planner 110 and/or one or more entities 120a-120n may each operate on one or more computer systems including one or more computers 112 that are integral to or separate from the hardware and/or software that support system 100. These one or more computer systems may include any suitable input device, such as a keypad, mouse, touch screen, microphone, or other device to input information. An output device may convey information associated with the operation of supply chain planner 110 and one or more entities 120a-120n, including digital or analog data, visual information, or audio information. These one or more computer systems may include fixed or removable computer storage media, such as magnetic computer disks, CD-ROM, or other suitable computer-implemented storage media to receive output from and provide input to system 100. These one or more computer systems may include one or more processors and associated memory to execute instructions and manipulate information according to the operation of system 100. Each of these one or more computer systems may be a work station, personal computer (PC), network computer, notebook computer, personal digital assistant (PDA), cell phone, wireless device, telephone, wireless data port, or any other suitable computing device.

In one embodiment, the memory associated with these one or more computer systems comprise any of a variety of data structures, arrangements, and/or compilations configured to store and facilitate retrieval of information. The memory may, for example, comprise one or more volatile or non-volatile memory devices. Although the memory is described as residing within these one or more computer systems, the memory may reside in any location or locations that are accessible by one or more computers 112 or the one or more processors. The memory receives and stores information related to on-hand inventory information associated with, for example, one or more entities 120a-120n. The one or more processors processes information stored in the memory and generates and accesses on-hand inventory profiles associated with one or more entities 120a-120n. The memory stores and the one or more processors process any suitable information to perform one or more inventory operations associated with one or more entities 120a-120n.

One or more servers 110 comprise one or more planning engines 116. Although one or more servers 114 is shown and described as comprising one or more planning engines 116, embodiments contemplate any suitable engines, solvers, or combination of engines and/or solvers, according to particular needs. One or more databases 118 comprises one or more databases, one or more buffers, and/or one or more other data storage arrangements at one or more locations, local to, or remote from, one or more servers 114. One or more databases 220 may be coupled with one or more servers 114 using one or more local area networks (LANs), metropolitan area networks (MANs), wide area networks (WANs), network 130, such as, for example, the Internet, or any other appropriate wire line, wireless, or other links. As explained below in more detail, one or more databases 118 comprise one or more nested data structures that store inventory data and on-hand inventory information of one or more entities 120a-120n that may be used by one or more servers 114.

In an embodiment, one or more users may be associated with supply chain planner 110 and/or one or more entities 120a-120n. These one or more users may, for example, manage on-hand inventory profiles and/or one or more related operations of one or more entities 120a-120n. In one embodiment, these one or more related operations include retrieving on-hand inventory information, adding on-hand inventory information, and retrieving minimum on-hand inventory information, in a computational efficient manner. In addition, or as an alternative, these users within system 100 may include, for example, one or more computer systems programmed to autonomously handle inventory planning and/or one or more related operations within system 100. As discussed above, one or more servers 114 may support one or more planning engines 116, including one or more planning engines, which store and retrieve inventory profiles, on a buffer of one or more databases 118, including a set of (date, quantity) pairs, where 'date' is the date on which 'quantity' amount of material enters the on-hand inventory of this buffer.

In one embodiment, supply chain planner 110 is coupled with network 130 using communications link 132, which may be any wireline, wireless, or other link suitable to support data communications between supply chain planner 110 and network 130 during operation of system 100. One or more entities 120a-120n are coupled with network 130 using communications links 134a-Specification 134n, which may be any wireline, wireless, or other link suitable to support data communications between one or more entities 120a-120n and network 130 during operation of system 100. Although communication links 132 and 134a-134n are shown as generally coupling supply chain planner 110 and one or more entities 120a-120n to network 130, supply chain planner 110 and one or more entities 120a-120n may communicate directly with each other, according to particular needs.

In addition, or as an alternative, network 130 may include the Internet and any appropriate local area networks (LANs), metropolitan area networks (MANS), or wide area networks (WANs) coupling supply chain planner 110 and one or more entities 120a-120n. For example, data may be maintained by supply chain planner 110 at one or more locations external to supply chain planner 110 and one or more entities 120a-120n and made available to one or more associated users of one or more entities 120a-120n using network 130 or in any other appropriate manner. Those skilled in the art will recognize that the complete structure and operation of communication network 130 and other components within system 100 are not depicted or described. Embodiments may be employed in conjunction with known communications networks and other components.

In one embodiment and as discussed below, supply chain planner 110 provides for a computationally efficient nested data structure that stores on-hand inventory information on one or more buffers of one or more databases 118, in a discrete time environment, wherein time is unitised in, for example, days and the time horizon is upper bounded in terms of, for example, the number of days. In addition and as discussed in more detail below, supply chain planner 110 divides the time horizon into a set of nested buckets until a bucket's length is equal to a predetermined amount of time.

As an example only and not by way of limitation, the nested data structure supports the operations of retrieving the total on-hand inventory information available on a given day (cumulative quantity up to a day) and adding a set of (day, quantity) pairs on to the on-hand inventory profile. In one embodiment, supply chain planner 110 can perform these operations in time O(log(N)) in worst case, where N is the number of (day, quantity) pairs (which is upper bounded by the number of days in the time horizon). As another example, the nested data structure supports the operations of retrieving all days (with their quantities) on which the total on-hand inventory information falls below a certain level and retrieving the minimum on-hand inventory information after a given day. In one embodiment, supply chain planner 110 can perform these operations in time O(N), since, for example, in the worst case all days of the time horizon could have their on-hand inventory information below the specified level and so no data structure can guarantee anything better.

Figure 2:
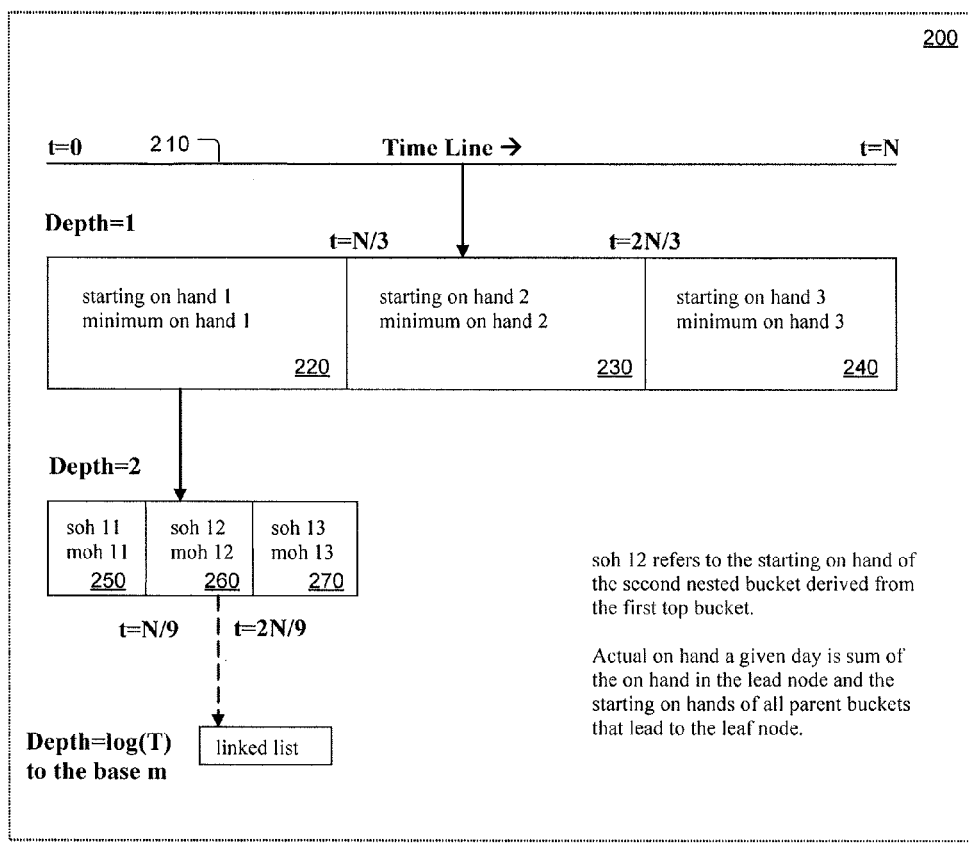
FIG. 2 illustrates a nested data structure in accordance with the preferred embodiment.

FIG. 2 illustrates a nested data structure 200 in accordance with the preferred embodiment. Nested data structure 200 comprises a time horizon 210 of a specified time interval, such as, for example, length T days. As discussed in more detail below, supply chain planner 110 divides time horizon 210 into m equal length buckets 220, 230, and 240, which as discussed in more detail below the optimal value for m is 3. In one embodiment, and as discussed below, m=3. In one embodiment, the length of each bucket 220 and 230 (except the last bucket 240) is the ceiling (upper integer) of T/m. In addition, or as an alternative, each of buckets 220, 230, and 240 may be further sub-divided into m equal length buckets 250, 260, and 270 (so that each of buckets 250, 260, and 270 length is $T/m^2$). Embodiments provide for dividing the bucket's until a bucket's length is equal to a predetermined amount of time, such as for example, one day. In addition, or as an alternative, at a leaf bucket 230 and 240 (i.e. a bucket which is not sub-divided into further buckets), a set of (day, quantity) pairs are stored in a linked list format. Although a particular nested data structure 200 is shown and described; embodiments contemplate any number of buckets, and/or any number of levels, according to particular needs.

Figure 3:
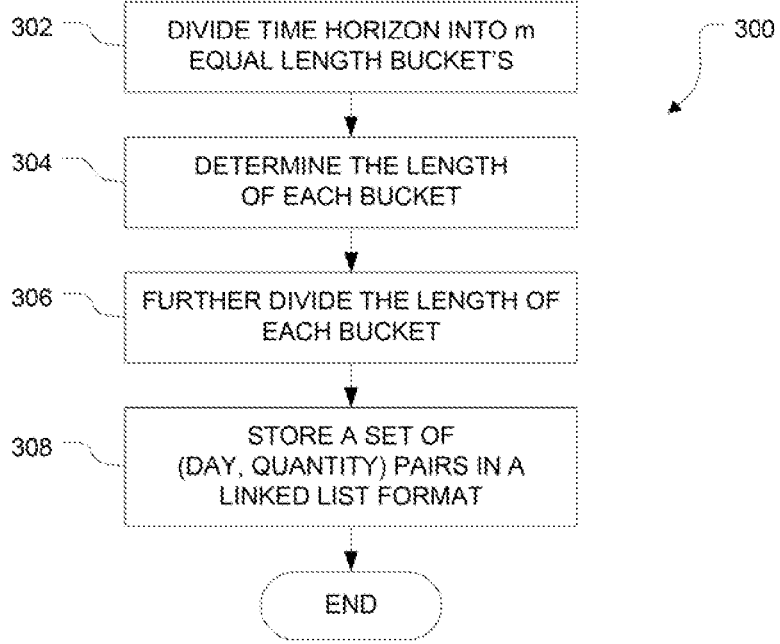
FIG. 3 illustrates an exemplary method of implementing a nested bucketization in a supply chain network.

FIG. 3 illustrates an exemplary method 300 of implementing a nested bucketization in a supply chain network. Supply chain planner 110 begins the method at step 302 by dividing time horizon 210 (of, for example, length T days) into m equal length bucket's wherein the optimal value for m is 3, thereby dividing time horizon 210 into m equal length buckets 220, 230, and 240. At step 304, supply chain planner 110 determines the length of each bucket 220 and 230 (except the last) is the ceiling (upper integer) of T/m. In addition, each of buckets 220, 230, and 240 may hold additional information, such as, for example, the starting on-hand inventory, minimum on-hand inventory, and maximum on-hand inventory information for that bucket. At step 306, supply chain planner 110 further sub-divides each of buckets 220, 230, and 240 into m equal length buckets, that is, each bucket's length is $T/m^2$. Supply chain planner 110 continues to divide the bucket's length until a bucket's length is equal to a predetermined amount of time, such as for example, one day.

At step 308, supply chain planner 110 stores a set of (day, quantity) pairs in a linked list format at each leaf bucket 230 and 240 (i.e. a bucket which is not sub-divided into further buckets) and the method ends. In addition, although, FIG. 3 illustrates one embodiment of a method of implementing a nested bucketization in a supply chain network, various changes may be made to method 300 without departing from the scope of embodiments of the present invention.

Figure 4:
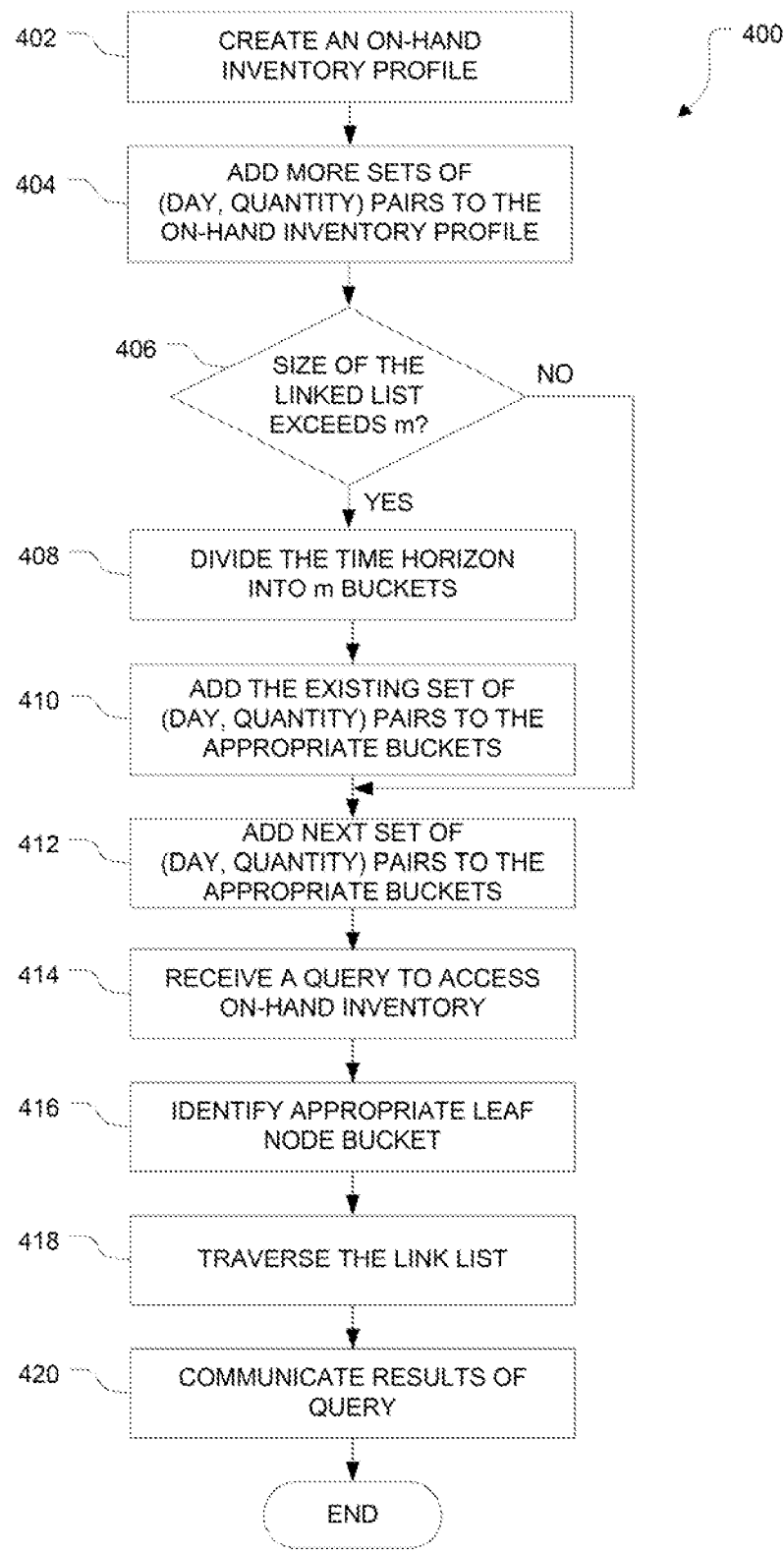
FIG. 4 illustrates an exemplary method of managing an on-hand inventory profile using nested bucketization.

FIG. 4 illustrates an exemplary method 400 of managing an on-hand inventory profile using nested bucketization. Supply chain planner 110 begins the method at step 402 by creating an on-hand inventory profile which comprises a set of (day, quantity) pairs where 'date' is the date on which 'quantity' amount of material enters the on-hand inventory of this buffer. In addition, when the on-hand inventory profile is first created it points to an empty linked list. At step 404, supply chain planner 110 adds more sets of (day, quantity) pairs to the on-hand inventory profile, the sets of (day, quantity) pairs are inserted into the linked list. In one embodiment, supply chain planner 110 inserts the set of (day, quantity) pairs into the linked list in a sorted manner (such as, for example, sorted in ascending order of days). In addition, for all nodes in the linked list beyond the current node, supply chain planner 110 increases the quantity of the on-hand inventory, since on-hand inventory is the net quantity present in inventory on a given day.

At step 406, supply chain planner 110 determines if the size of the linked list exceeds m. If the size of the linked list exceeds m, the method proceeds to step 408, otherwise, the methods proceeds to step 412. At step 408, supply chain planner 110 divides the time horizon 210 into m buckets. At step 410, supply chain planner 110 adds the existing set of (day, quantity) pairs to the appropriate buckets and stores the existing set of (day, quantity) pairs within the buckets in separate linked lists.

At step 412, supply chain planner 110 adds the next set of (day, quantity) pairs to the on-hand inventory profile by adding it to the linked list within the appropriate bucket as discussed above. In one embodiment, because the bucket lengths are constant, supply chain planner 110 identifies the appropriate bucket in time O(1). In addition, or as an alternative, for all buckets after the current bucket, supply chain planner 110 augments the starting on-hand inventory of each of those buckets by quantity. In addition, as soon as any linked list grows beyond the size m, supply chain planner 110 sub-divides that bucket into further buckets. In the worst case, and as shown in FIG. 2 nested bucketization can go on until the depth of nestedness is $\log_m T$.

Furthermore, when supply chain planner 110 adds a new set of (day, quantity) pairs to the on-hand inventory profile, supply chain planner 110 first identifies the appropriate leaf node bucket (in the worst case, this can take $O(\log_m T)$ time, since that is the worst case depth of nestedness). In addition, insertion of the set of (day, quantity) pairs to that bucket requires supply chain planner 110 to search all nodes in the linked list before 'day' (to identify the position to insert) and subsequent updation of nodes after 'day'. In one embodiment, this takes a constant time of 'm'. Thereafter, supply chain planner 110 updates the starting on-hand inventory of all buckets after this bucket which requires updation of buckets after current bucket, updation of buckets after the parent bucket of current bucket and so on until the top level of nestedness i.e. supply chain planner 110 traverses the depth of the nestedness and at each level, updates all the buckets after the current bucket. This requires (in the worst case), $O(m*\log_m T)$ time. In one embodiment, once supply chain planner 110 updates the starting on-hand inventory of a later bucket, there is no need for supply chain planner 110 to traverse down within the sub-buckets of that later bucket to update their starting on-hand inventory. Thus, in the worst case, adding on-hand inventory can take $O(m*\log_m T)$ time.

At step 414, supply chain planner 110 receives a query from one or more entities 120a-120n to access on-hand inventory on a given day. At step 416, supply chain planner 110 first identifies, similar to the insertion step 404, the appropriate leaf node bucket in $O(\log_m T)$ time. At step 418, supply chain planner 110 traverses the linked list present in this bucket to identify the on-hand inventory on the given day (in one embodiment, if there is no entry corresponding to that day, supply chain planner 110 selects the on-hand inventory entry on the latest day before that day and if no such entry is present supply chain planner 110 selects zero). This takes a constant time of m (in the worst case). In addition, supply chain planner 110 augments the on-hand inventory so obtained from the linked list node with the starting on-hand inventory of all buckets traversed while identifying this bucket. In one embodiment, this is the starting on-hand inventory of current bucket, its parent bucket, then that bucket's parent and so on until top level bucket is reached. In addition, or as an alternative, this step may be performed simultaneously during the process of identifying the leaf node bucket corresponding to 'day'. Thus, in the worst case, the net time taken for this query is $O(\log_m T)$ time. In addition, if the number of add on-hand inventory operations is more than the query for on-hand inventory, it is attempted to minimize $O(m*\log_m T)$ time over m, i.e., this happens for m=3.

In one embodiment, for the purpose of identifying the minimum on-hand inventory after a given day and as discussed above minimum on-hand inventory information is stored within each nested bucket. In addition, maintaining this information does not add to the complexity of nested data structure 200, but allows the minimum on-hand inventory in a time range to be queried in $O(m*\log_m T)$ time. In another embodiment, for the purpose of identifying the maximum on-hand inventory after a given day and as discussed above maximum on-hand inventory information is stored in each nested bucket. In addition, supply chain planner 110 can also implement a query to receive all on-hand inventories less than a given level after a given day, even though its performance will be only in O(T) time. In addition, or as an alternative, a continuous time line can also be divided into nested buckets (the maximum depth of nestedness can be controlled as a parameter) and the continuous time line nested data structure can be embedded at the leaf bucket.

At step 420, supply chain planner 110 communicates the results of the query to one or more entities 120a-120n and the method ends. In addition, although, FIG. 4 illustrates one embodiment of a method of managing an on-hand inventory profile using nested bucketization, various changes may be made to method 300 without departing from the scope of embodiments of the present invention.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for providing nested bucketization in a supply chain network, comprising:
    a database that stores data describing a time horizon of a specified time interval; and
    a computer comprising a processor and a memory, the computer coupled with the database and configured to:
        access the data describing the time horizon of the specified time interval;
        create an on-hand inventory profile that points to an empty linked list when first created and comprises a set of (day, quantity) pairs, wherein day of the set of (day, quantity) pairs is a date on which an amount of material enters an on-hand inventory, and quantity of the set of (day, quantity) pairs is the amount of material that enters the on-hand inventory on the date;
        store the on-hand inventory profile in the database;
        add one or more sets of (day, quantity) pairs to the on-hand inventory profile by inserting the one or more sets of (day, quantity) pairs into the linked list;
        divide the time horizon into multiple nested buckets;
        add the one or more sets of (day, quantity) pairs to the nested buckets and store the one or more sets of (day, quantity) pairs within the nested buckets in separate linked lists; and
        add the one or more sets of (day, quantity) pairs to the on-hand inventory profile by adding it to the linked list within the nested bucket.

2. The system of claim 1, wherein the one or more sets of (day, quantity) pairs is inserted into the linked list in a sorted manner.

3. The system of claim 1, wherein the computer is further configured to receive a query from one or more users to access on-hand inventory on a given day.

4. The system of claim 3, wherein the computer is further configured to traverse the linked list present in one or more of the multiple nested buckets to identify the on-hand inventory on a given day.

5. The system of claim 1, wherein day of the sets of (day, quantity) pairs is a time at which an amount of material enters an on-hand inventory.

6. The system of claim 1, wherein the time horizon is divided into three nested buckets.

7. The system of claim 1, wherein a length of each of the nested buckets except for a last nested bucket is equal to the first whole integer rounded up from the result of the time horizon divided by number of nested buckets.

8. A computer-implemented method of nested bucketization, comprising:
    accessing, by a computer, data describing a time horizon of a specified time interval;
    creating, by the computer, an on-hand inventory profile that points to an empty link when first created and comprises a set of (day, quantity) pairs, wherein day of the set of (day, quantity) pairs is a date on which an amount of material enters an on-hand inventory, and quantity of the set of (day, quantity) pairs is the amount of material that enters the on-hand inventory on the date; and
    storing, by the computer, the on-hand inventory profile in a database;
    adding, by the computer, one or more sets of (day, quantity) pairs to the on-hand inventory profile by inserting the one or more sets of (day, quantity) pairs into the linked list;
    dividing, by the computer, the time horizon into multiple nested buckets;
    adding, by the computer, the one or more sets of (day, quantity) pairs to the appropriate nested buckets and storing the one or more sets of (day, quantity) pairs within the nested buckets in separate linked lists; and
    adding the one or more sets of (day, quantity) pairs to the on-hand inventory profile by adding it to the linked list within the appropriate nested bucket.

9. The method of claim 8, wherein the one or more sets of (day, quantity) pairs is inserted into the linked list in a sorted manner.

10. The method of claim 8, further comprising receiving a query from one or more users to access on-hand inventory on a given day.

11. The method of claim 10, further comprising traversing the linked list present in one or more of the multiple nested buckets to identify the on-hand inventory on a given day.

12. The method of claim 8, wherein day of the sets of (day, quantity) pairs is a time at which an amount of material enters an on-hand inventory.

13. The method of claim 8, wherein the time horizon is divided into three nested buckets.

14. The method of claim 8, wherein a length of each of the nested buckets except for a last nested bucket is equal to the first whole integer rounded up from the result of the time horizon divided by number of nested buckets.

15. A non-transitory computer-readable storage medium embodied with software providing nested bucketization in a supply chain network, the software when executed using one or more computers is configured to:
    access data describing a time horizon of a specified time interval;
    create an on-hand inventory profile that points to an empty link list when first created and comprises a set of (day, quantity) pairs, wherein day of the set of (day, quantity) pairs is a date on which an amount of material enters an on-hand inventory, and quantity of the set of (day, quantity) pairs is the amount of material that enters the on-hand inventory on the date; and
    store the on-hand inventory profile in a database;
    add one or more sets of (day, quantity) pairs to the on-hand inventory profile by inserting the one or more sets of (day, quantity) pairs into the linked list;
    divide the time horizon into multiple nested buckets;
    add the one or more sets of (day, quantity) pairs to the appropriate nested buckets and storing the one or more sets of (day, quantity) pairs within the nested buckets in separate linked lists;
    add the one or more sets of (day, quantity) pairs to the on-hand inventory profile by adding it to the linked list within the appropriate nested bucket.

16. The non-transitory computer-readable storage medium of claim 15, wherein the software is further configured to add one or more sets of (day, quantity) pairs to the on-hand inventory profile by inserting the one or more sets of (day, quantity) pairs into the linked list.

17. The non-transitory computer-readable storage medium of claim 16, wherein the one or more sets of (day, quantity) pairs is inserted into the linked list in a sorted manner.

18. The non-transitory computer-readable storage medium of claim 17, wherein the software is further configured to add the one or more sets of (day, quantity) pairs to the appropriate nested buckets and storing the one or more sets of (day, quantity) pairs within the nested buckets in separate linked lists.

19. The non-transitory computer-readable storage medium of claim 18, wherein the software is further configured to add the one or more sets of (day, quantity) pairs to the on-hand inventory profile by adding it to the linked list within the appropriate nested bucket.

20. The non-transitory computer-readable storage medium of claim 16, wherein the software is further configured to receive a query from one or more users to access on-hand inventory on a given day.

21. The non-transitory computer-readable storage medium of claim 20, wherein the software is further configured to traverse the linked list present in one or more of the multiple nested buckets to identify the on-hand inventory on a given day.

22. The non-transitory computer-readable storage medium of claim 15, wherein the software is further configured to divide the time horizon into multiple nested buckets.

23. The non-transitory computer-readable storage medium of claim 15, wherein day of the sets of (day, quantity) pairs is a time at which an amount of material enters an on-hand inventory.

24. The non-transitory computer-readable storage medium of claim 15, wherein the time horizon is divided into three nested buckets.

25. The non-transitory computer-readable storage medium of claim 15, wherein a length of each of the nested buckets except for a last nested bucket is equal to the first whole integer rounded up from the result of the time horizon divided by number of nested buckets.

* * * * *

UNITED STATES PATENT AND TRADEMARK OFFICE
CERTIFICATE OF CORRECTION

PATENT NO. : 8,650,206 B2
APPLICATION NO. : 12/689345
DATED : February 11, 2014
INVENTOR(S) : Jayan Moorkanat et al.

It is certified that error appears in the above-identified patent and that said Letters Patent is hereby corrected as shown below:

In the Specification

1. Please amend the paragraph appearing at Column 4, lines 25-39:

In one embodiment, supply chain planner 110 is coupled with network 130 using communications link 132, which may be any wireline, wireless, or other link suitable to support data communications between supply chain planner 110 and network 130 during operation of system 100. One or more entities 120a-120n are coupled with network 130 using communications links 134a-134n, which may be any wireline, wireless, or other link suitable to support data communications between one or more entities 120a-120n and network 130 during operation of system 100. Although communication links 132 and 134a-134n are shown as generally coupling supply chain planner 110 and one or more entities 120a-120n to network 130, supply chain planner 110 and one or more entities 120a-120n may communicate directly with each other, according to particular needs.

Signed and Sealed this
Fifth Day of April, 2016

Michelle K. Lee
*Director of the United States Patent and Trademark Office*